(12) United States Patent
Shepelev et al.

(10) Patent No.: US 10,365,762 B2
(45) Date of Patent: Jul. 30, 2019

(54) REDUCED NOISE BY PERFORMING PROCESSING DURING LOW-NOISE PERIODS OF INTERFERING CIRCUITRY

(71) Applicant: SYNAPTICS INCORPORATED, San Jose, CA (US)

(72) Inventors: Petr Shepelev, Campbell, CA (US); John Michael Weinerth, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 174 days.

(21) Appl. No.: 15/085,900

(22) Filed: Mar. 30, 2016

(65) Prior Publication Data

US 2017/0285859 A1 Oct. 5, 2017

(51) Int. Cl.
G06F 3/041 (2006.01)
G06F 3/044 (2006.01)

(52) U.S. Cl.
CPC ............ G06F 3/0418 (2013.01); G06F 3/044 (2013.01); G06F 3/0412 (2013.01)

(58) Field of Classification Search
None
See application file for complete search history.

(56) References Cited

U.S. PATENT DOCUMENTS

| | | | |
|---|---|---|---|
| 6,961,050 B2 | 11/2005 | Choi | |
| 7,633,494 B2 | 12/2009 | Na | |
| 9,189,097 B2 | 11/2015 | Kim et al. | |
| 2002/0089491 A1* | 7/2002 | Willig | G06F 3/0412 345/173 |
| 2003/0051927 A1* | 3/2003 | Inamori | G06F 3/0418 178/18.01 |
| 2004/0100450 A1* | 5/2004 | Choi | G06F 3/0412 345/173 |
| 2004/0227735 A1* | 11/2004 | Pratt | G06F 3/0416 345/173 |
| 2005/0140634 A1 | 6/2005 | Takatori | |
| 2010/0328226 A1 | 12/2010 | Simmons | |
| 2011/0012618 A1 | 1/2011 | Teterwak et al. | |
| 2011/0057890 A1 | 3/2011 | Goo et al. | |
| 2011/0210939 A1 | 9/2011 | Reynolds et al. | |
| 2011/0210941 A1 | 9/2011 | Reynolds et al. | |
| 2012/0001857 A1 | 1/2012 | Chang | |
| 2013/0321332 A1* | 12/2013 | Yoshimura | G06F 3/044 345/174 |
| 2014/0022203 A1 | 1/2014 | Karpin et al. | |
| 2015/0302831 A1 | 10/2015 | Reynolds | |
| 2016/0070279 A1 | 3/2016 | Heiling | |
| 2017/0123552 A1* | 5/2017 | Brunet | G06F 3/0416 |

* cited by examiner

*Primary Examiner* — Christopher R Lamb
(74) *Attorney, Agent, or Firm* — Patterson + Sheridan, LLP

(57) ABSTRACT

An input device, system, and processing system are disclosed for a display device with an integrated sensing device. The input device comprises a plurality of sensor electrodes, and a processing system coupled with the plurality of sensor electrodes. The processing system is configured to determine one or more low-noise periods associated with display update timing of the display device, and process, during the determined one or more low-noise periods, resulting signals received from the plurality of sensor electrodes.

16 Claims, 8 Drawing Sheets

REDUCED NOISE BY PERFORMING PROCESSING DURING LOW-NOISE PERIODS OF INTERFERING CIRCUITRY

BACKGROUND

Field

Embodiments of the present invention generally relate to techniques for operating an input device having a display device with an integrated sensing device.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

One embodiment described herein is an input device having a display device with an integrated sensing device. The input device comprises a plurality of sensor electrodes, and a processing system coupled with the plurality of sensor electrodes. The processing system is configured to determine one or more low-noise periods associated with display update timing of the display device, and process, during the determined one or more low-noise periods, resulting signals received from the plurality of sensor electrodes.

Another embodiment described herein is a processing system for a display device with an integrated sensing device. The processing system comprises display driver circuitry configured to update the display device based on display update timing of the display device, and sensor circuitry coupled with a plurality of sensor electrodes. The sensor circuitry is configured to determine one or more low-noise periods associated with the display update timing of the display device, and process, during the determined one or more low-noise periods, resulting signals received from the plurality of sensor electrodes.

Another embodiment described herein is a system comprising a processing system comprising analog-to-digital conversion (ADC) circuitry within a power domain, and interfering circuitry within the power domain. The processing system is configured to determine one or more discrete noise events produced by the interfering circuitry, and to control the ADC circuitry to perform ADC operations during one or more time periods during which the one or more discrete noise events do not occur.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

Figure 1:
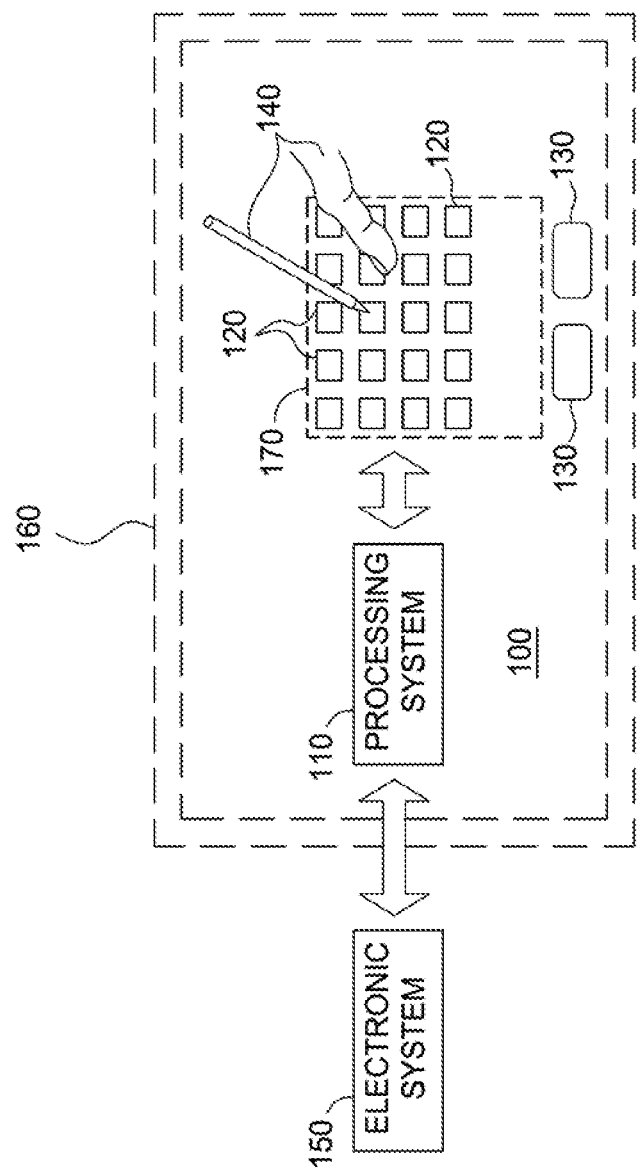
FIG. 1 is a schematic block diagram of an input device, according to embodiments described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

Various embodiments of the present technology provide input devices and methods for improving usability. An input device may include electrodes that are operated as sensor electrodes to detect interaction between the input device and an input object (e.g., a stylus or a user's finger). Processing of the resulting signals acquired by the sensor electrodes may be susceptible to noise introduced by operation of other components within the same power domain. The interfering components may be external to the input device (e.g., an electronic device comprising a host processor and communicatively coupled with the input device) or internal to the input device (e.g., other circuitry).

According to various embodiments described herein, capacitive sensing performance of the input device may be improved using a processing system configured to determine one or more low-noise periods during which interfering circuitry generates relatively low noise. The processing system is further configured to schedule or otherwise synchronize the performance of the susceptible processing functions so that they occur within the determined low-noise periods. This can include dividing the susceptible processing functions into portions that are performed over a plurality of determined low-noise periods. For example, certain analog-to-digital conversion (ADC) operations such as successive approximation are performed as discrete iterations, which naturally lend themselves to be distributed across a plurality of low-noise periods. The improvement to capacitive sensing performance can enable certain features such as side touch, hover detection, proximity detection, glove touch, etc. that are generally associated with a weaker touch signal.

Exemplary Input Device Implementations

FIG. 1 is a schematic block diagram of an input device 100, in accordance with embodiments of the present technology. In various embodiments, input device 100 comprises a display device integrated with a sensing device. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 170. Example input objects include fingers and styli, as shown in FIG. 1.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

The input device 100 may utilize any combination of sensor components and sensing technologies to detect user input in the sensing region 170. The input device 100 comprises a plurality of sensor electrodes 120 for detecting user input. The input device 100 may include one or more sensor electrodes 120 that are combined to form sensor electrodes. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensor electrodes 120 pickup loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensor electrodes 120 to create electric fields. In some capacitive implementations, separate sensor electrodes 120 may be ohmically shorted together to form larger sensor electrodes. Some capacitive implementations utilize resistive sheets, which may be uniformly resistive.

As discussed above, some capacitive implementations utilize "self-capacitance" (or "absolute capacitance") sensing methods based on changes in the capacitive coupling between sensor electrodes 120 and an input object. In one embodiment, processing system 110 is configured to drive a voltage with known amplitude onto the sensor electrode 120 and measure the amount of charge required to charge the sensor electrode to the driven voltage. In other embodiments, processing system 110 is configured to drive a known current and measure the resulting voltage. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g. system ground) using a modulated signal, and by detecting the capacitive coupling between the sensor electrodes 120 and input objects 140.

Additionally as discussed above, some capacitive implementations utilize "mutual capacitance" (or "transcapacitance") sensing methods based on changes in the capacitive coupling between sensing electrodes. In various embodiments, an input object 140 near the sensing electrodes alters the electric field between the sensing electrodes, thus changing the measured capacitive coupling. In one implementation, a transcapacitive sensing method operates by detecting the capacitive coupling between one or more transmitter sensing electrodes (also "transmitter electrodes") and one or more receiver sensing electrodes (also "receiver electrodes") as further described below. Transmitter sensing electrodes may be modulated relative to a reference voltage (e.g., system ground) to transmit a transmitter signals. Receiver sensing electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensing electrodes may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensor electrode(s) 120 of the input device 100. In other embodiments, components of processing system 110 are physically separate with one or more components close to sensor electrode(s) 120 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensor electrodes 120 to detect input, identification modules configured to identify gestures such as mode changing gestures, and mode changing modules for changing operation modes. Processing system 110 may also comprise one or more controllers.

In some embodiments, the processing system 110 responds to user input (or lack of user input) in the sensing region 170 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensor electrode(s) 120 of the input device 100 to produce electrical signals indicative of input (or lack of input) in the sensing region 170. The processing system 110 may perform any appropriate amount of processing on the electrical signals in producing the information provided to the electronic system. For example, the processing system 110 may digitize analog electrical signals obtained from the sensor electrodes 120. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality. FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of the display device 160. For example, the input device 100 may comprise substantially transparent sensor electrodes 120 overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Exemplary Sensor Electrode Arrangements

Figure 2:
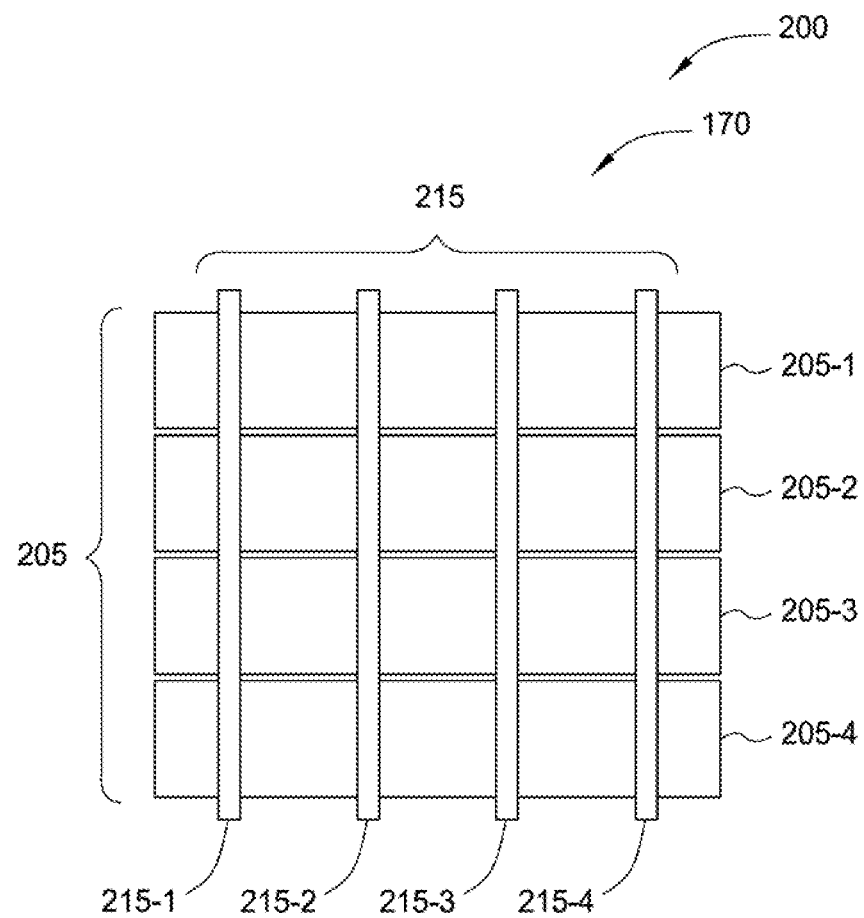
FIGS. 2 and 3 illustrate portions of exemplary sensor electrode arrangements, according to embodiments described herein.
Figure 3:
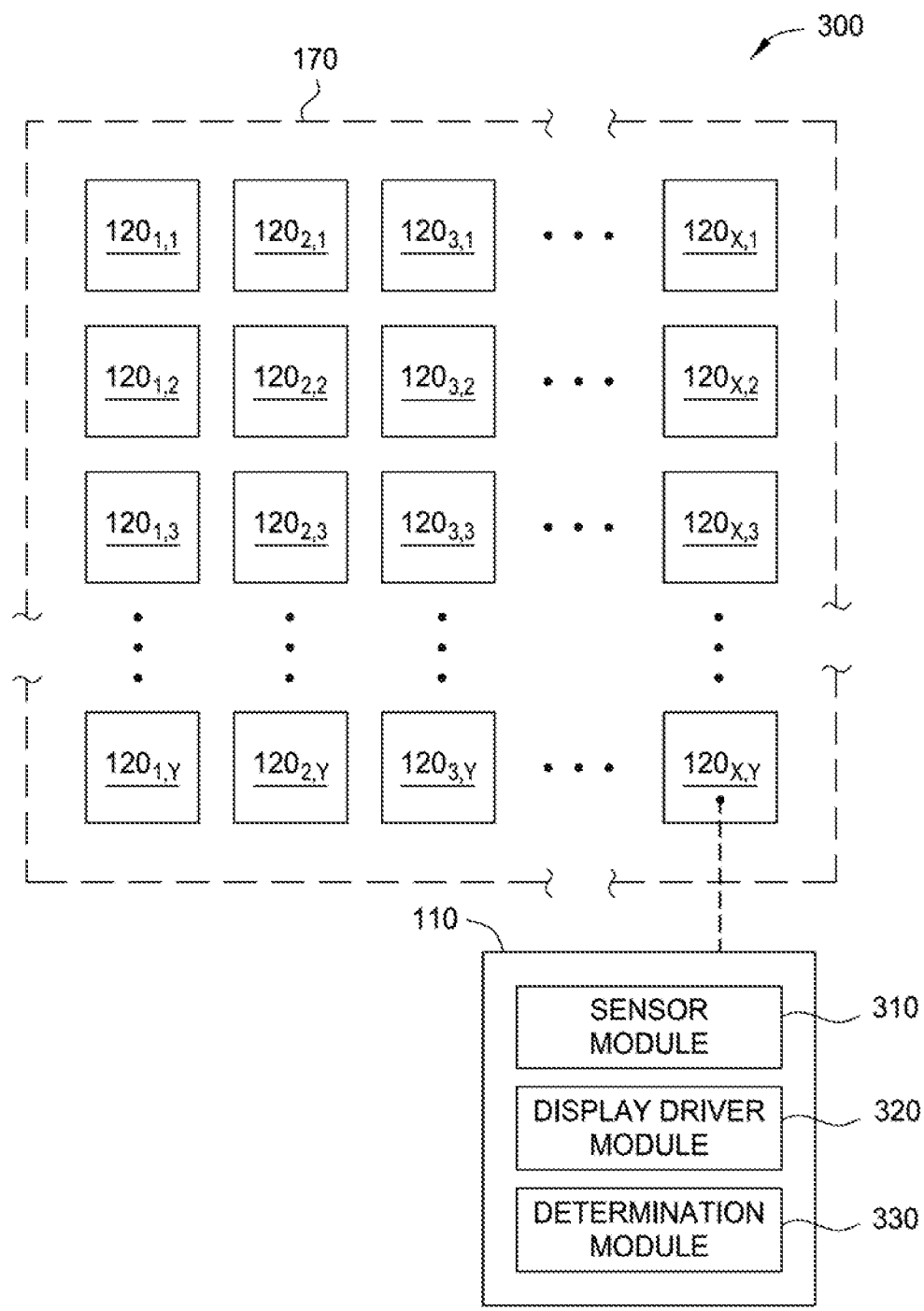

FIGS. 2 and 3 illustrate portions of exemplary sensor electrode arrangements, according to embodiments described herein. Specifically, arrangement 200 (FIG. 2) illustrates a portion of a pattern of sensor electrodes configured to sense in a sensing region 170 associated with the pattern, according to several embodiments. For clarity of illustration and description, FIG. 2 shows the sensor electrodes in a pattern of simple rectangles, and does not show various associated components. This pattern of sensing electrodes comprises a first plurality of sensor electrodes 205 (e.g., 205-1, 205-2, 205-3, 205-4), and a second plurality of sensor electrodes 215 (e.g., 215-1, 215-2, 215-3, 215-4). The sensor electrodes 205, 215 are each examples of the sensor electrodes 120 discussed above. In one embodiment, processing system 110 operates the first plurality of sensor electrodes 205 as a plurality of transmitter electrodes, and the second plurality of sensor electrodes 215 as a plurality of receiver electrodes. In another embodiment, processing system 110 operates the first plurality of sensor electrodes 205 and the second plurality of sensor electrodes 215 as absolute capacitive sensing electrodes.

The first plurality of sensor electrodes 205 and the second plurality of sensor electrodes 215 are typically ohmically isolated from each other. That is, one or more insulators separate the first plurality of sensor electrodes 205 and the second plurality of sensor electrodes 215 and prevent them from electrically shorting to each other. In some embodiments, the first plurality of sensor electrodes 205 and the second plurality of sensor electrodes 215 may be disposed on a common layer. The pluralities of sensor electrodes 205, 215 may be electrically separated by insulative material disposed between them at cross-over areas; in such constructions, the first plurality of sensor electrodes 205 and/or the second plurality of sensor electrodes 215 may be formed with jumpers connecting different portions of the same electrode. In some embodiments, the first plurality of sensor electrodes 205 and the second plurality of sensor electrodes 215 are separated by one or more layers of insulative material. In some embodiments, the first plurality of sensor electrodes 205 and the second plurality of sensor electrodes 215 are separated by one or more substrates; for example, they may be disposed on opposite sides of the same substrate, or on different substrates that are laminated together.

The pluralities of sensor electrodes 205, 215 may be formed into any desired shapes. Moreover, the size and/or shape of the sensor electrodes 205 may be different than the size and/or shape of the sensor electrodes 215. Additionally, sensor electrodes 205, 215 located on a same side of a substrate may have different shapes and/or sizes. In one embodiment, the first plurality of sensor electrodes 205 may be larger (e.g., having a larger surface area) than the second plurality of sensor electrodes 215, although this is not a requirement. In other embodiments, the first and second pluralities of sensor electrodes 205, 215 may have a similar size and/or shape.

In one embodiment, the first plurality of sensor electrodes 205 extends substantially in a first direction while the second plurality of sensor electrodes 215 extends substantially in a second direction. For example, and as shown in FIG. 2, the first plurality of sensor electrodes 205 extend in one direction, while the second plurality of sensor electrodes 215 extend in a direction substantially orthogonal to the sensor electrodes 205. Other orientations are also possible (e.g., parallel or other relative orientations).

In some embodiments, both the first and second pluralities of sensor electrodes 205, 215 are located outside of a plurality (or display stack) of layers that together form the display device 160. One example of a display stack may include layers such as a lens layer, a one or more polarizer layers, a color filter layer, one or more display electrodes layers, a display material layer, a thin-film transistor (TFT) glass layer, and a backlight layer. However, other arrangements of a display stack are possible. In other embodiments, one or both of the first and second pluralities of sensor electrodes 205, 215 are located within the display stack, whether included as part of a display-related layer or a separate layer. For example, Vcom electrodes within a particular display electrode layer can be configured to perform both display updating and capacitive sensing.

Arrangement 300 of FIG. 3 illustrates a portion of a pattern of sensor electrodes configured to sense in sensing region 170, according to several embodiments. For clarity of illustration and description, FIG. 3 shows the sensor electrodes 120 in a pattern of simple rectangles and does not show other associated components. The exemplary pattern comprises an array of sensor electrodes $120_{X,Y}$ arranged in X columns and Y rows, wherein X and Y are positive integers, although one of X and Y may be zero. It is contemplated that the pattern of sensor electrodes 120 may have other configurations, such as polar arrays, repeating patterns, non-repeating patterns, a single row or column, or other suitable arrangement. Further, in various embodiments the number of sensor electrodes 120 may vary from row to row and/or column to column. In one embodiment, at least one row and/or column of sensor electrodes 120 is offset from the others, such it extends further in at least one direction than the others. The sensor electrodes 120 is coupled to the processing system 110 and utilized to determine the presence (or lack thereof) of an input object in the sensing region 170.

In a first mode of operation, the arrangement of sensor electrodes 120 ($120_{1,1}$, $120_{2,1}$, $120_{3,1}$, . . . , $120_{X,Y}$) may be utilized to detect the presence of an input object via absolute sensing techniques. That is, processing system 110 is configured to modulate sensor electrodes 120 to acquire measurements of changes in capacitive coupling between the modulated sensor electrodes 120 and an input object to determine the position of the input object. Processing system 110 is further configured to determine changes of absolute capacitance based on a measurement of resulting signals received with sensor electrodes 120 which are modulated.

In some embodiments, the arrangement 300 includes one or more grid electrodes (not shown) that are disposed between at least two of the sensor electrodes 120. The grid electrode(s) may at least partially circumscribe the plurality of sensor electrodes 120 as a group, and may also, or in the alternative, completely or partially circumscribe one or more of the sensor electrodes 120. In one embodiment, the grid electrode is a planar body having a plurality of apertures, where each aperture circumscribes a respective one of the sensor electrodes 120. In other embodiments, the grid electrode(s) comprise a plurality of segments that may be driven individually or in groups or two or more segments. The grid electrode(s) may be fabricated similar to the sensor electrodes 120. The grid electrode(s), along with sensor electrodes 120, may be coupled to the processing system 110 utilizing conductive routing traces and used for input object detection.

The sensor electrodes 120 are typically ohmically isolated from each other, and are also ohmically isolated from the grid electrode(s). That is, one or more insulators separate the sensor electrodes 120 and grid electrode(s) and prevent them from electrically shorting to each other. In some embodiments, the sensor electrodes 120 and grid electrode(s) are separated by an insulative gap, which may be filled with an electrically insulating material, or may be an air gap. In some embodiments, the sensor electrodes 120 and the grid electrode(s) are vertically separated by one or more layers of insulative material. In some other embodiments, the sensor electrodes 120 and the grid electrode(s) are separated by one or more substrates; for example, they may be disposed on opposite sides of the same substrate, or on different substrates. In yet other embodiments, the grid electrode(s) may be composed of multiple layers on the same substrate, or on different substrates. In one embodiment, a first grid electrode may be formed on a first substrate (or a first side of a substrate) and a second grid electrode may be formed on a second substrate (or a second side of a substrate). For example, a first grid electrode comprises one or more common electrodes disposed on a thin-film transistor (TFT) layer of the display device 160 (FIG. 1) and a second grid electrode is disposed on the color filter glass of the display device 160. The dimensions of the first and second grid electrodes can be equal or differ in at least one dimension.

In a second mode of operation, the sensor electrodes 120 ($120_{1,1}$, $120_{2,1}$, $120_{3,1}$, . . . , $120_{X,Y}$) may be utilized to detect the presence of an input object via transcapacitive sensing techniques when a transmitter signal is driven onto the grid electrode(s). That is, processing system 110 is configured to drive the grid electrode(s) with a transmitter signal and to receive resulting signals with each sensor electrode 120, where a resulting signal comprising effects corresponding to the transmitter signal, which is utilized by the processing system 110 or other processor to determine the position of the input object.

In a third mode of operation, the sensor electrodes 120 may be split into groups of transmitter and receiver electrodes utilized to detect the presence of an input object via transcapacitive sensing techniques. That is, processing system 110 may drive a first group of sensor electrodes 120 with a transmitter signal and receive resulting signals with the second group of sensor electrodes 120, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to switch between any two or more of the modes described above.

The areas of localized capacitive sensing of capacitive couplings may be termed "capacitive pixels," "touch pixels," "tixels," etc. Capacitive pixels may be formed between an individual sensor electrode 120 and a reference voltage in the first mode of operation, between the sensor electrodes 120 and grid electrode(s) in the second mode of operation, and between groups of sensor electrodes 120 used as transmitter and receiver electrodes (e.g., arrangement 200 of FIG. 2). The capacitive coupling changes with the proximity and motion of input objects in the sensing region 170 associated with the sensor electrodes 120, and thus may be used as an indicator of the presence of the input object in the sensing region of the input device 100.

In some embodiments, the sensor electrodes 120 are "scanned" to determine these capacitive couplings. That is, in one embodiment, one or more of the sensor electrodes 120 are driven to transmit transmitter signals. Transmitters may be operated such that one transmitter electrode transmits at one time, or such that multiple transmitter electrodes transmit at the same time. Where multiple transmitter electrodes transmit simultaneously, the multiple transmitter electrodes may transmit the same transmitter signal and thereby produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined. In one embodiment, multiple transmitter electrodes may simultaneously transmit the same transmitter signal while the receiver electrodes receive the effects and are measured according to a scanning scheme.

The sensor electrodes 120 configured as receiver sensor electrodes may be operated singly or multiply to acquire resulting signals. The resulting signals may be used to determine measurements of the capacitive couplings at the capacitive pixels. Processing system 110 may be configured to receive with the sensor electrodes 120 in a scanning fashion and/or a multiplexed fashion to reduce the number of simultaneous measurements to be made, as well as the size of the supporting electrical structures. In one embodiment, one or more sensor electrodes are coupled to a receiver of processing system 110 via a switching element such as a multiplexer or the like. In such an embodiment, the switching element may be internal to processing system 110 or external to processing system 110. In one or more embodiments, the switching elements may be further configured to couple a sensor electrode 120 with a transmitter or other signal and/or voltage potential. In one embodiment, the switching element may be configured to couple more than one receiver electrode to a common receiver at the same time.

In other embodiments, "scanning" sensor electrodes 120 to determine these capacitive couplings comprises modulating one or more of the sensor electrodes and measuring an absolute capacitance of the one or sensor electrodes. In another embodiment, the sensor electrodes may be operated such that more than one sensor electrode is driven and received with at a time. In such embodiments, an absolute capacitive measurement may be obtained from each of the one or more sensor electrodes 120 simultaneously. In one embodiment, each of the sensor electrodes 120 are simultaneously driven and received with, obtaining an absolute capacitive measurement simultaneously from each of the sensor electrodes 120. In various embodiments, processing system 110 may be configured to selectively modulate a portion of sensor electrodes 120. For example, the sensor electrodes may be selected based on, but not limited to, an application running on the host processor, a status of the input device, and an operating mode of the sensing device. In various embodiments, processing system 110 may be configured to selectively shield at least a portion of sensor electrodes 120 and to selectively shield or transmit with the grid electrode(s) 122 while selectively receiving and/or transmitting with other sensor electrodes 120.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In any of the above embodiments, multiple sensor electrodes 120 may be ganged together such that the sensor electrodes 120 are simultaneously modulated or simultaneously received with. As compared to the methods described above, ganging together multiple sensor electrodes may produce a coarse capacitive image that may not be usable to discern precise positional information. However, a coarse capacitive image may be used to sense presence of an input object. In one embodiment, the coarse capacitive image may be used to move processing system 110 or the input device 100 out of a "doze" mode or low-power mode. In one embodiment, the coarse capacitive image may be used to move a capacitive sensing IC out of a "doze" mode or low-power mode. In another embodiment, the coarse capacitive image may be used to move at least one of a host IC and a display driver out of a "doze" mode or low-power mode. The coarse capacitive image may correspond to the entire sensor area or only to a portion of the sensor area.

The background capacitance of the input device 100 is the capacitive image associated with no input object in the sensing region 170. The background capacitance changes with the environment and operating conditions, and may be estimated in various ways. For example, some embodiments take "baseline images" when no input object is determined to be in the sensing region 170, and use those baseline images as estimates of their background capacitances. The background capacitance or the baseline capacitance may be present due to stray capacitive coupling between two sensor electrodes, where one sensor electrode is driven with a modulated signal and the other is held stationary relative to system ground, or due to stray capacitive coupling between a receiver electrode and nearby modulated electrodes. In many embodiments, the background or baseline capacitance may be relatively stationary over the time period of a user input gesture.

Capacitive images can be adjusted for the background capacitance of the input device 100 for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, one or more of the sensor electrodes 120 comprise one or more display electrodes used in updating the display of the display screen. The display electrodes may comprise one or more elements of the active matrix display such as one or more segments of a segmented Vcom electrode (common electrode(s)), a source drive line, gate line, an anode sub-pixel electrode or cathode pixel electrode, or any other suitable display element. These display electrodes may be disposed on an appropriate display screen substrate. For example, the common electrodes may be disposed on the a transparent substrate (a glass substrate, TFT glass, or any other transparent material) in some display screens (e.g., In-Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the display electrode can also be referred to as a "combination electrode," since it performs multiple functions. In various embodiments, each of the sensor electrodes 120 comprises one or more common electrodes. In other embodiments, at least two sensor electrodes 120 may share at least one common electrode. While the following description may describe that sensor electrodes 120 and/or grid electrode(s) comprise one or more common electrodes, various other display electrodes as describe above may also be used in conjunction with the common electrode or as an alternative to the common electrodes. In various embodiments, the sensor electrodes 120 and grid electrode(s) comprise the entire common electrode layer (Vcom electrode).

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer multiple of the display frame rate. In one or more embodiments, the display frame rate may change (e.g., to reduce power or to provide additional image data such as a 3D display information) while touch frame rate maintains constant. In other embodiment, the display frame rate may remain constant while the touch frame rate is increased or decreased.

Continuing to refer to FIG. 3, the processing system 110 coupled to the sensor electrodes 120 includes a sensor module 310 and optionally, a display driver module 320. The sensor module 310 includes circuitry configured to drive at least one of the sensor electrodes 120 for capacitive sensing during periods in which input sensing is desired. In one embodiment, the sensor module 310 is configured to drive a modulated signal onto the at least one sensor electrode 120 to detect changes in absolute capacitance between the at least one sensor electrode and an input object. In another embodiment, the sensor module 310 is configured to drive a transmitter signal onto the at least one sensor electrode 120 to detect changes in a transcapacitance between the at least one sensor electrode and another sensor electrode 120. The modulated and transmitter signals are generally varying voltage signals comprising a plurality of voltage transitions over a period of time allocated for input sensing. In various embodiments, the sensor electrodes 120 and/or grid electrode(s) may be driven differently in different modes of operation. In one embodiment, the sensor electrodes 120 and/or grid electrode(s) may be driven with signals (modulated signals, transmitter signals and/or shield signals) that may differ in any one of phase, amplitude, and/or shape. In various embodiments, the modulated signal and transmitter signal are similar in at least one shape, frequency, amplitude, and/or phase. In other embodiments, the modulated signal and the transmitter signals are different in frequency, shape, phase, amplitude, and phase. The sensor module 310 may be selectively coupled one or more of the sensor electrodes 120 and/or the grid electrode(s). For example, the sensor module 310 may be coupled selected portions of the sensor electrodes 120 and operate in either an absolute or transcapacitive sensing mode. In another example, the sensor module 310 may be a different portion of the sensor electrodes 120 and operate in either an absolute or transcapacitive sensing mode. In yet another example, the sensor module 310 may be coupled to all the sensor electrodes 120 and operate in either an absolute or transcapacitive sensing mode.

The sensor module 310 is configured to operate the grid electrode(s) as a shield electrode that may shield sensor electrodes 120 from the electrical effects of nearby conductors. In one embodiment, the processing system is configured to operate the grid electrode(s) as a shield electrode that may "shield" sensor electrodes 120 from the electrical effects of nearby conductors, and to guard the sensor electrodes 120 from grid electrode(s), at least partially reducing the parasitic capacitance between the grid electrode(s) and the sensor electrodes 120. In one embodiment, a shielding signal is driven onto the grid electrode(s). The shielding signal may be a ground signal, such as the system ground or other ground, or any other constant voltage (i.e., non-modulated) signal. In another embodiment, operating the grid electrode(s) as a shield electrode may comprise electrically floating the grid electrode. In one embodiment, grid electrode(s) are able to operate as an effective shield electrode while being electrode floated due to its large coupling to the other sensor electrodes. In other embodiment, the shielding signal may be referred to as a "guarding signal" where the guarding signal is a varying voltage signal having at least one of a similar phase, frequency, and amplitude as the modulated signal driven on to the sensor electrodes. In one or more embodiment, routing traces may be shielded from responding to an input object due to routing beneath the grid electrode(s) and/or sensor electrodes 120, and therefore may not be part of the active sensor electrodes, shown as sensor electrodes 120.

In one or more embodiments, capacitive sensing (or input sensing) and display updating may occur during at least partially overlapping periods. For example, as a common electrode is driven for display updating, the common electrode may also be driven for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiments, the non-display update period may be referred to as a "long horizontal blanking period," "long h-blanking period" or a "distributed blanking period," where the blanking period occurs between two display updating periods and is at least as long as a display update period. In one embodiment, the non-display update period occurs between display line update periods of a frame and is long enough to allow for multiple transitions of the transmitter signal to be driven onto the sensor electrodes 120. In other embodiments, the non-display update period may comprise horizontal blanking periods and vertical blanking periods. Processing system 110 may be configured to drive sensor electrodes 120 for capacitive sensing during any one or more of or any combination of the different non-display update times. Synchronization signals may be shared between sensor module 310 and display driver module 320 to provide accurate control of overlapping display updating and capacitive sensing periods with repeatably coherent frequencies and phases. In one embodiment, these synchronization signals may be configured to allow the relatively stable voltages at the beginning and end of the input sensing period to coincide with display update periods with relatively stable voltages (e.g., near the end of a input integrator reset time and near the end of a display charge share time). A modulation frequency of a modulated or transmitter signal may be at a harmonic of the display line update rate, where the phase is determined to provide a nearly constant charge coupling from the display elements to the receiver electrode, allowing this coupling to be part of the baseline image.

The sensor module 310 includes circuitry configured to receive resulting signals with the sensor electrodes 120 and/or grid electrode(s) comprising effects corresponding to the modulated signals or the transmitter signals during periods in which input sensing is desired. The sensor module 310 may determine a position of the input object in the sensing region 170 or may provide a signal including information indicative of the resulting signal to another module or processor, for example, a determination module 330 or a processor of an associated electronic device 150 (i.e., a host processor), for determining the position of the input object in the sensing region 170.

The display driver module 320 may be included in or separate from the processing system 110. The display driver module 320 includes circuitry configured to provide display image update information to the display of the display device 160 during non-sensing (e.g., display updating) periods.

In one embodiment, the processing system 110 comprises a first integrated controller comprising the display driver module 320 and at least a portion of the sensor module 310 (i.e., transmitter module and/or receiver module). In another embodiment, the processing system 110 comprises a first integrated controller comprising the display driver module 320 and a second integrated controller comprising the sensor module 310. In yet another embodiment, the processing system comprises a first integrated controller comprising display driver module 320 and a first portion of the sensor module 310 (e.g., one of a transmitter module and a receiver module) and a second integrated controller comprising a second portion of the sensor module 310 (e.g., the other one of the transmitter and receiver modules). In those embodiments comprising multiple integrated circuits, a synchronization mechanism may be coupled between them, configured to synchronize display updating periods, sensing periods, transmitter signals, display update signals, and the like.

As mentioned above, in some embodiments a determination module 330 may be configured to determine a position of the input object in the sensing region 170. The determination module 330 may be further configured to perform other functions related to coordinating the operation of various components of the processing system 110. For example, performing analog-to-digital conversion (ADC) and other processing functions may be susceptible to noise introduced by interfering circuitry. In some embodiments, the determination module 330 determines one or more low-noise periods during which interfering circuitry generates relatively low noise, and schedules or otherwise synchronizes the performance of the susceptible processing functions such that they occur within the determined low-noise periods. This can include performing dividing of the susceptible processing functions into portions performed over a plurality of low-noise periods. For example, certain ADC operations such as successive approximation include discrete iterations, which naturally lend themselves to be distributed across a plurality of low-noise periods. In an alternate embodiment, some or all of the functionality attributed to the determination module 330 may be provided by a processor external to the processing system 110 (e.g., a host processor of an associated electronic system).

Exemplary Display Device Arrangements

Figure 4:
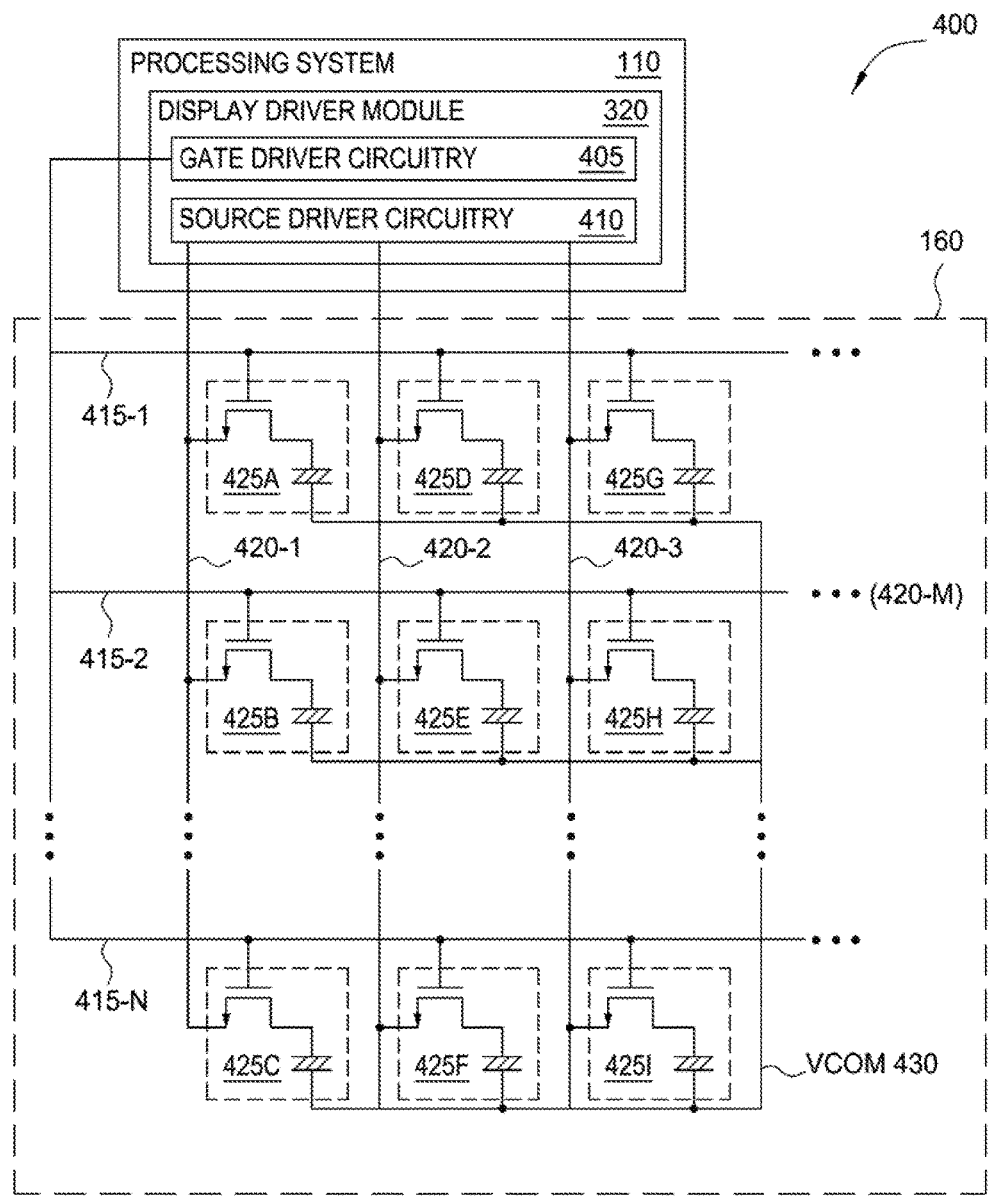
FIG. 4 illustrates an exemplary display device arrangement, according to embodiments described herein.

FIG. 4 illustrates an exemplary display device arrangement, according to embodiments described herein. Within arrangement 400, the display device 160 may be integrated with an input device and may further include the processing system 110. The display driver module 320 of processing system 110 generally includes gate driver circuitry 405 and source driver circuitry 410, which are collectively operated to update the image displayed by the display device 160.

As shown, gate driver circuitry 405 is coupled with a plurality of N gate lines 415-1, 415-2, . . . , 415-N of the display device 160. Source driver circuitry 410 is coupled with a plurality of M source lines 420-1, 420-2, 420-3, . . . , 420-M of the display device 160. In some embodiments, the gate driver circuitry 405 is separate from the display driver module 320. In other embodiments, the gate driver circuitry 405 is on a separate integrated circuit (IC) from the source driver circuitry 410. For example, the source driver circuitry 410 may be included within an integrated touch and display IC, and the gate driver circuitry 405 is located elsewhere. As shown, the gate driver circuitry 405 is coupled with each of the N gate lines, and source driver circuitry 410 is coupled with each of the M source lines. However, other embodiments may include switching logic (e.g., multiplexers) within the display device 160 for providing a reduced number of physical connections between the processing system 110 and display device 160.

In one embodiment, processing system 110 and display device 160 are separate components. For example, the processing system 110 may be an application-specific integrated circuit (ASIC) that is communicatively coupled with the display device 160 via one or more transmission lines. However, in one embodiment, processing system 110 may be integrated into the display device 160 (e.g., mounted on a common substrate) to form a single component.

The source driver circuitry 410 may receive an input digital signal which is converted to an analog signal and transmitted on the source lines 420-1 to 420-M. Display device 160 includes one or more display pixels 425 (as shown, display pixels 425A-425I) that are coupled with gate driver circuitry 405 via respective gate lines 415-1 to 415-N (also referred to as "rows" or "lines"). The display pixels 425 (in contrast to the capacitive pixels discussed above) may be used to display an image on the display device 160. The display pixels 425 may be used in a light-emitting diode (LED), organic LED (OLED), cathode ray tube (CRT), liquid crystal display (LCD), plasma, electroluminescence (EL), or other display technology to display the image.

To update a particular display pixel 425, the gate driver circuitry 405 activates one of the gate lines 415. In one embodiment, each display pixel 425 includes a switching element that permits the state of the source line 420 (e.g., a voltage or current value) to change the brightness of the display pixel 425. The state of the source line 420 is typically defined relative to a common electrode (VCOM) 430, which can be shared by a plurality of the display pixels 425. For example, to update display pixel 425E, gate driver circuitry 405 operates gate line 415-2 to control the switching element such that the signal generated by source driver circuitry 410 and driven onto source line 420-2 changes the voltage across the display pixel 425E to VCOM 430. By coordinating timing of the gate driver circuitry 405 with the signals transmitted by the source driver circuitry 410, the processing system 110 may set each of the display pixels 425 of the display device 160 to respective analog states.

In some embodiments, as discussed above, processing system 110 and display device 160 may include input sensing circuitry and logic for supporting user input. For the sake of clarity, the embodiments provided below do not discuss input sensing functions. However, these functions are explicitly contemplated. That is, the display circuitry and functions discussed herein may be combined with additional circuitry for enabling user input via input sensing.

In some embodiments, different source lines 420 of the display device 160 are each associated with a respective display sub-pixel. In this embodiment, each display pixel 425 is divided into a respective plurality of display sub-pixels whose visual outputs are combined to provide the color associated with the display pixel 425. One non-limiting example includes three sub-pixels (e.g., red, green, and blue sub-pixels) per display pixel; other numbers of sub-pixels are possible according to any suitable color model (e.g., four, five sub-pixels). Accordingly, when setting the states of each display sub-pixel (and thus the color of the associated display pixel 425), the source driver circuitry 410 may use three separate drive phases, one for each display sub-pixel. To select between the different sub-pixel source lines 420, display device 160 includes a multiplexer (mux). Based on a sub-pixel select signal, the mux permits the analog state transmitted by source driver circuitry 410 to reach only one of the three source lines 420 at any given time. Thus, in one example the source driver circuitry 410 can use only a single conductive element to transmit three unique analog states to each sub-pixel source line 420. Moreover, each display pixel 425 is shown including a capacitor representing a liquid crystal pixel, but as discussed above, the display device 160 is not limited to this type.

In the example described above, source driver circuitry 410 is selectively coupled with three source lines 420, but the present disclosure is not limited to such. Instead, the embodiments described herein may be used in display devices 160 that use source driver circuitry 410 to driver any number of source lines 420. Moreover, the example described above included a single select signal to couple the source lines 420 with the source driver circuitry 410, but in other embodiments it may be preferable to use separate conductive paths to update display sub-pixels.

Figure 5:
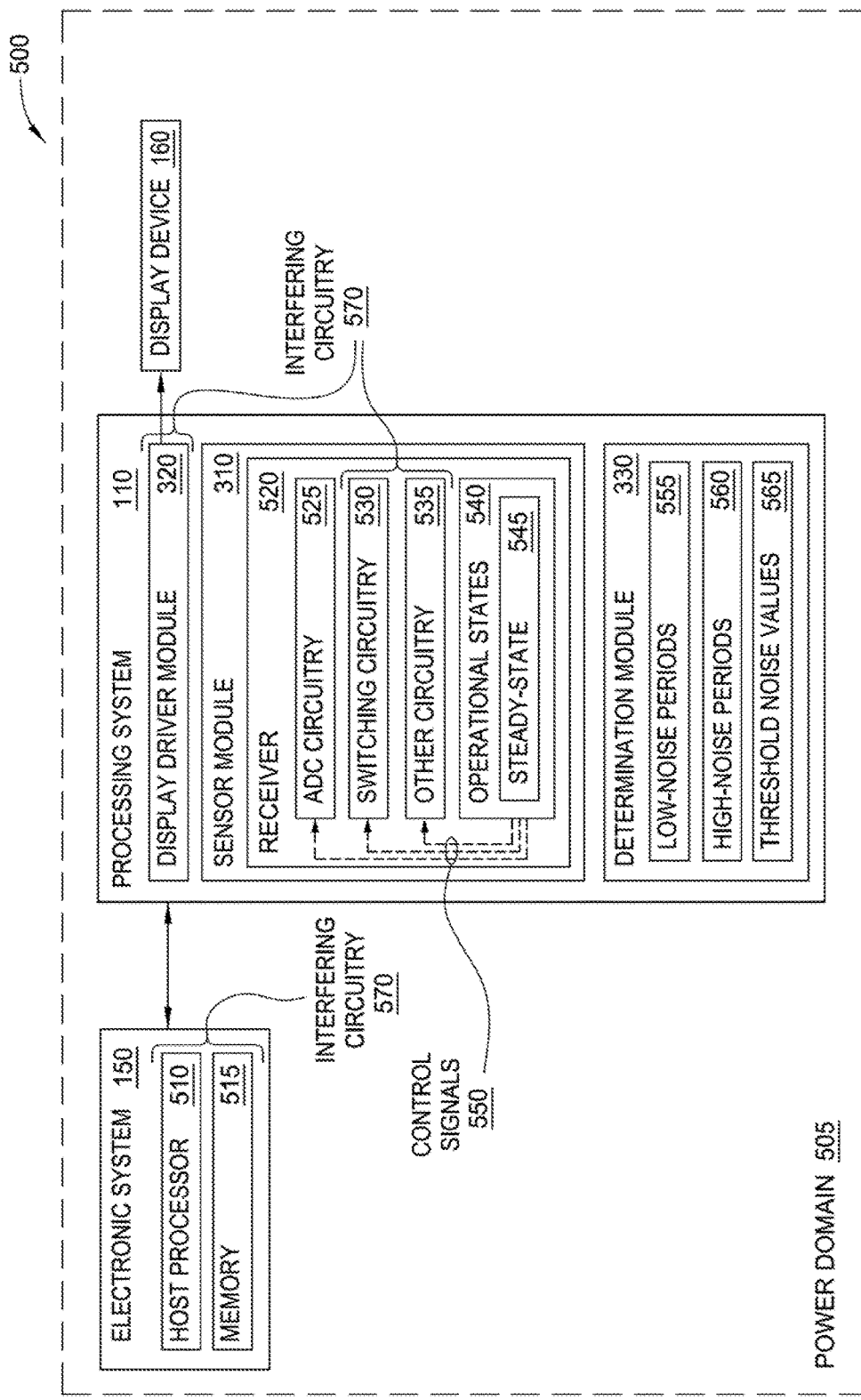
FIG. 5 illustrates an exemplary system within a power domain, according to embodiments described herein.

Reduced Noise by Performing Processing During Low-noise Periods of Interfering Circuitry FIG. 5 illustrates an exemplary system within a power domain, according to embodiments described herein. Specifically, the system 500 includes elements from input device 100 (e.g., processing system 110 and display device 160) and the electronic system 150 depicted in FIG. 1.

Within system 500, the electronic system 150, processing system 110, and display device 160 are included within a single power domain 505. As discussed herein, components included in the same power domain indicates that at least one voltage reference provided by an associated power supply (e.g., voltage rails) is shared by the components. Some non-limiting examples of a shared voltage reference include ground and VDD voltages.

The electronic system 150 includes a host processor 510 and a memory 515. The sensor module 310 of the processing system 110 includes one or more receivers 520 configured to perform processing of resulting signals acquired by sensor electrodes that are coupled with the processing system 110. As shown, receiver 520 includes analog-to-digital conversion (ADC) circuitry 525 and switching circuitry 530. In some embodiments, the receiver 520 comprises an analog front-end (AFE), which in turn comprises the ADC circuitry 525. The ADC circuitry 525 may perform any suitable type of ADC, such as successive approximation, sigma-delta, and so forth. In one exemplary embodiment, the ADC circuitry 525 performs ADC of acquired signals over a number of separate iterations, (e.g., successive approximation). The receiver 520 may further include other circuitry 535 related to performing processing of acquired signals, such as amplifiers, filters, etc.

The operation of various components within the same power domain 505 can cause fluctuations or transients to occur on the voltage references. Specifically, changes to the amount of current drawn during operation of the components may result in transients on the voltage references, contributing to noise and potentially affecting processing by other components within the power domain 505.

Generally, ADC circuitry 525 can be susceptible to transients occurring on the voltage references, which can affect the accuracy of ADC operations. Understanding that various other components within the power domain 505 may be similarly susceptible to the transients, for simplicity the discussion will focus on operation of the ADC circuitry 525, as well as the operation of other components relative to the ADC circuitry 525. For example, relative to other susceptible components within the power domain 505, the ADC circuitry 525 may be considered interfering circuitry 570.

A number of components within the power domain 505 are labeled as interfering circuitry 570. As defined herein, interfering circuitry 570 refers to any circuitry whose operation can introduce transients onto the voltage references in sufficient amounts (amplitude, duration, etc.) that impact operation of at least one other component connected with the voltage references. As shown, and relative to the ADC circuitry 525, the interfering circuitry 570 includes a host processor 510 and memory 515 of the electronic system 150, display driver module 320, and switching circuitry 530 and other circuitry 535 included with the ADC circuitry 525 within the receiver 520. The examples of interfering circuitry 570 shown within system 500 are not limiting; greater or fewer components may be capable of introducing transients, as well as other components.

Various operations of the interfering circuitry 570 may introduce transients onto the voltage references. One non-limiting example related to the display driver module 320 includes the charging of capacitive loads within display device 160, e.g., corresponding to changes of state of the source driver circuitry to recharge source lines and/or pixel capacitances. Another non-limiting example related to display driver module 320 includes transients in control signals provided by gate drivers. One non-limiting example related to a power supply within power domain 505 includes charging reservoir capacitors in associated power regulators. Some non-limiting examples related to the receiver 520 include charging and discharging of capacitors, as well as operating switching circuitry 530 (i.e., opening and/or closing switches). One non-limiting example related to the electronic device 150 includes performing other digital logic operations, such as execution of code by host processor 510 and performing memory refresh operations on memory 515.

In various embodiments described herein, the timing of operations of susceptible components within the power domain 505 may be coordinated or scheduled to avoid known or determined transients of interfering circuitry 570 within the power domain 505. Additionally or alternately, the timing of operations of interfering circuitry 570 may be coordinated or scheduled to avoid overlap of transients with the operation of the susceptible components. The determination module 330 is configured to determine one or more low-noise periods 555 having relatively reduced or substantially no transients on the voltage references. The determination module 330 may include or may be coupled with sensing hardware configured to detect the transients. The determination module 330 may further perform signal analysis to characterize the timing of the transients. In some embodiments, the determination module 330 may receive information communicated from the other components (e.g., display driver module 320 is beginning an operation that is known to cause transients on the voltage references). In some embodiments, the determination module 330 is configured to update the timing of operations of susceptible components and/or interfering circuitry 570 dynamically.

Coordinating the operation of susceptible components to occur during low-noise periods generally provides improved and/or more consistent performance of the susceptible components. For example, in the case of ADC operations for a capacitive sensing input device, the coordination improves touch sensing performance, and can enable features such as side touch, hover detection, proximity detection, glove touch, etc. that are generally associated with a weaker touch signal.

In some embodiments, the determination module 330 is configured to detect one or more high-noise periods 560, and determines the low-noise periods 555 based on the determined high-noise periods 560. The determination module 330 may include threshold noise values 565 that define the low-noise periods 555 and/or high-noise periods 560. Alternatively, the determination module 330 determines one or more discrete noise events, and determines low-noise periods 555 based on these. The threshold noise values 565 may alternately be used to define a discrete noise event. In some cases, the high-noise periods 560 can have a relatively stable periodicity. For example, the display line update rate and display frame update rate are generally well-controlled by the display driver module 320, so that transients related to display updating may have substantially periodic qualities. In one embodiment, the determination module 330 determines a low-noise period 555 by imposing a predetermined delay after detecting a particular noise event. The predetermined delay may be programmable and/or adjustable by the determination module 330. For example, a transition between updating one display line and updating another display line may introduce significant transients onto the voltage reference due to the charging and/or discharging of the associated display electrodes. As a result, the determination module 330 may determine a low-noise period 555 that begins at some time after the transition is detected so that effects from the transition are mitigated.

In some embodiments, the determination module 330 may affirmatively control operation of some or all of the interfering circuitry 570 within the power domain 505. In some cases, the determination module 330 establishes a low-noise period 555 with a desired timing through this controlled operation of interfering circuitry 570. In other cases, the determination module 330 determines a low-noise period 555 relating to at least one component (i.e., whose operation is not controlled by the determination module 330), and the determination module 330 controls operation of other components to further reduce transients during the determined low-noise period 555.

One non-limiting example of controlling operation of interfering circuitry 570 includes stalling code execution by the host processor 510 through duty cycling and/or stalled clock signals. Another non-limiting example of controlling operation of interfering circuitry 570 includes adjusting the timing of memory refresh cycles of memory 515. Other non-limiting examples of controlling operation of interfering circuitry 570 includes pausing the switching operations of switching circuitry 530 within the receiver 520, and pausing (or adjusting timing of) operations of other circuitry 535 requiring charge and/or discharge of capacitances.

In some embodiments, receiver 520 corresponds to a plurality of predetermined operational states 540. Receiver 520 generally provides control signals 550 to each of ADC circuitry 525, switching circuitry 530, and/or other circuitry 535; the control signals 550 can vary based on which one of the predetermined operational states 540 is selected. In one embodiment, the operational states 540 include a steady-state 545 operational state in which the switching circuitry 530 and the other circuitry 535 are operated to reduce effects on the voltage references. In one embodiment, in the steady-state 545 switching operations (i.e., opening and/or closing) of the switching circuitry 530 may be paused, and the timing of operations of the other circuitry 535 may be adjusted or paused.

Figure 6:
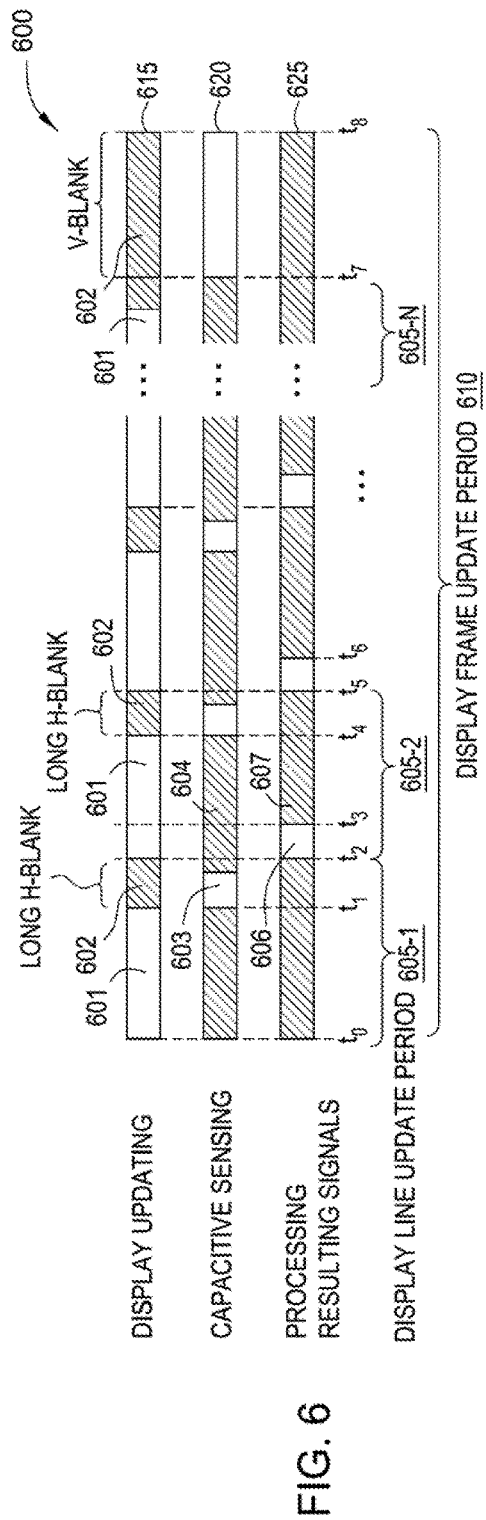
FIG. 6 is a timing diagram illustrating effects of display updating on processing resulting signals, according to embodiments described herein.

FIG. 6 is a timing diagram illustrating effects of display updating on processing resulting signals, according to embodiments described herein. As mentioned above, the discussion is generally focused on the operation of ADC circuitry, but the principles can be applied to operation of other susceptible components. Further, the timing of plot 600 is not drawn to scale.

Plot 600 includes a display updating subplot 615, a capacitive sensing subplot 620, and a processing resulting signals subplot 625. The display updating subplot 615 includes a number of display update periods 601 and non-display update periods 602. Within a particular display frame update period 610 (i.e., between times $t_0$ and $t_8$), the non-display update periods 602 may have the same or differing lengths. As shown in display updating subplot 615, long horizontal blanking (long h-blank) periods are included within each display line update period 605-1, 605-2, . . . , 605-N, and a vertical blanking (v-blank) period is included at the end of the display frame update period 610. In alternate embodiments, some or all of the long h-blank periods can be replaced by "normal" h-blank periods and/or the length of the v-blank period may vary.

The capacitive sensing subplot 620 includes a number of sensing periods 603 and non-sensing periods 604. Generally, and consistent with the discussion provided above, during sensing periods 603 sensing signals are transmitted on sensor electrodes and resulting signals acquired using the same or different sensor electrodes. While the sensing periods 603 are shown as non-overlapping with display update periods 601, in other embodiments sensing periods 603 may be partly or fully overlapping with display update periods 601. The resulting signals may be demodulated during the sensing periods 603. The transmitted sensing signals generally may correspond to a single continuous burst of a plurality of positive and negative sensing half-cycles. Alternately, the burst may be comprised by a plurality of sub-bursts. For input into the processing system, the resulting (analog) signals are generally converted using ADC circuitry.

Processing of the acquired resulting signals occurs in processing periods 606 and does not occur in non-processing periods 607. The processing periods 606 generally occurs following completion of a single burst or completion of a final sub-burst of the burst. As shown, processing period 606 occurs contemporaneously with a display update period 601 between times $t_2$ and $t_3$. During processing period 606, voltage references of the analog power supply may have noise transients caused by the source driver circuitry driving the capacitive load of the display device, which may be more pronounced near the beginning of display update period 601 and during transitions between display lines. In some embodiments, processing periods 606 are performed exclusively during non-display update periods 602, regardless of whether sensing periods 603 are overlapping or non-overlapping with the non-display update periods 603.

Figure 7:
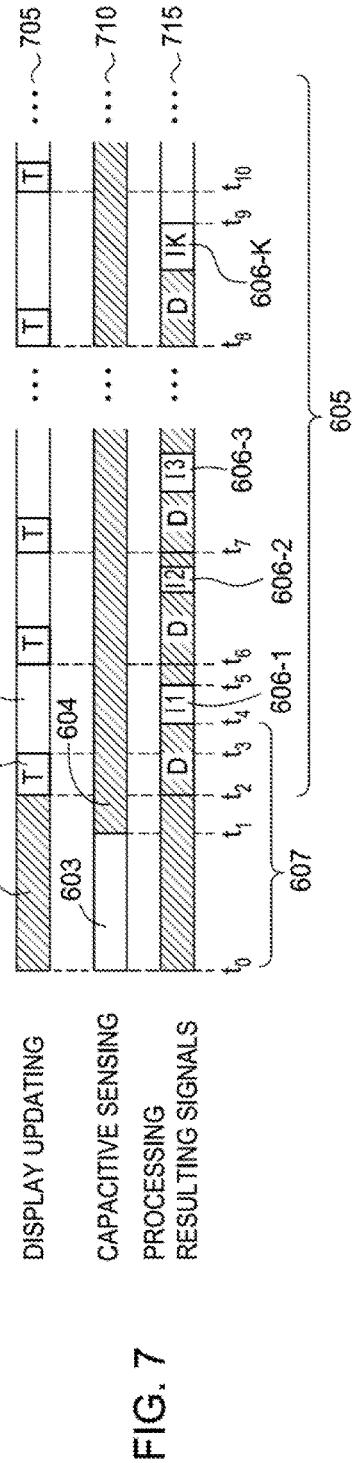
FIG. 7 is a timing diagram illustrating delaying iterations of processing resulting signals based on display line update transitions, according to embodiments described herein.

FIG. 7 is a timing diagram illustrating delaying iterations of processing resulting signals based on display line update transitions, according to embodiments described herein. Specifically, plot 700 illustrates a scenario in which processing of the resulting signals is performed during relatively low-noise portions of display update periods. The timing of plot 700 is not drawn to scale.

Plot 700 includes a display updating subplot 705, a capacitive sensing subplot 710, and a processing resulting signals subplot 715. Plot 700 illustrates the start of a display line update period 605 at time $t_2$. For example, non-display updating period 602 may correspond to a long h-blank period within which sensing period 603 occurs. As discussed above, in some embodiments the sensing periods 603 may be fully or partly overlapping with display updating periods. As shown, the sensing period 603 does not last the entire duration of the non-display update period 602, although this is not a requirement.

During the display line update period 605 beginning at time $t_2$, a number of transitions occur as the source driver circuitry and/or gate driver circuitry begins updating a new display line (or transitions between updating one display line and another display line within the display frame). Each transition reflects some change in capacitive loading on the display driver module, which results in transients such as a ripple or bounce occurring on power supply voltage references or ground. Transition (T) periods 720 and non-transition periods 721 are indicated in display updating subplot 705.

If the processing of acquired signals began immediately following the completion of sensing period 603, the processing period would likely overlap with one or more transition periods 720 of the display updating subplot 705, which could introduce noise into ADC measurements unnecessarily. In some cases, the determination module may identify the transition periods 720 as high-noise periods (such as high-noise period 560 illustrated in FIG. 5), or alternately, as discrete noise events. The determination module may determine one or more low-noise periods, generally corresponding to the non-transition periods 721.

In some cases, the determination module determines whether the processing period for processing the acquired resulting signals from sensing period 603 would fit within a single non-transition period 721 (alternately, within a single low-noise period). When the processing period would not fit, the determination module is configured to schedule or distribute portions of the processing to be performed during different non-transition periods 721 (or different low-noise periods). Using the example of successive approximation ADC, which includes a plurality of K iterations I1-IK, the determination module may schedule one or more iterations to occur within different low-noise periods. As shown, each non-transition period 721 includes a respective processing period 606-1, 606-2, 606-3, . . . , 606-K, each of which corresponds to a single iteration I1, I2, I3, . . . , IK of the ADC operation. However, in some cases the determination module may include more than one iteration per processing period 606-1, 606-2, 606-3, . . . , 606-K, e.g., based on the length of the low-noise period (non-transition period 721).

In some embodiments, upon detecting the beginning of a transition period 720, the determination module can impose a delay (D) prior to performing the next processing period 606-1, 606-2, 606-3, . . . , 606-K. The delay may be programmable and/or adjustable, e.g., based on the length of the transition period 720 and/or the periodicity of the transition periods 720.

Figure 8:
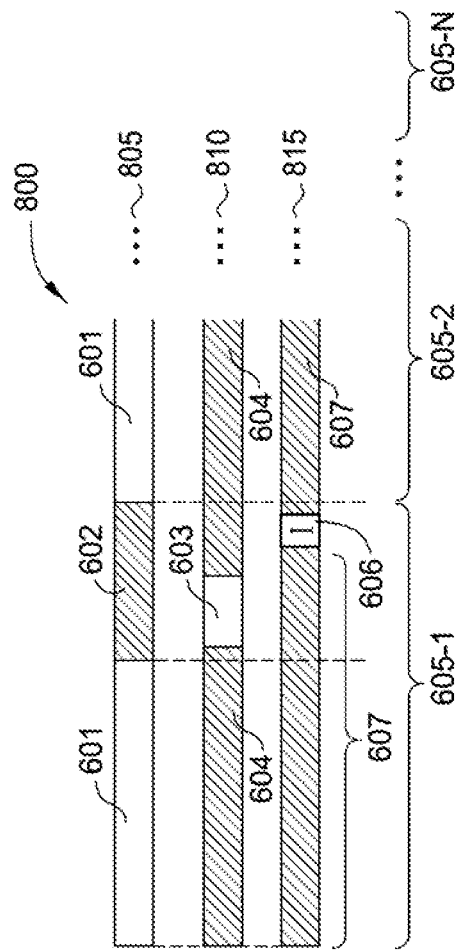
FIG. 8 is a timing diagram illustrating performing iterations of processing resulting signals within non-display update periods, according to embodiments described herein.

FIG. 8 is a timing diagram illustrating performing iterations of processing resulting signals within non-display update periods, according to embodiments described herein. Specifically, plot 800 illustrates a scenario in which processing of the resulting signals is performed during dedicated portions of non-display updating periods. The timing of plot 800 is not shown to scale.

Plot 800 includes a display updating subplot 805, a capacitive sensing subplot 810, and a processing resulting signals subplot 815. Plot 800 illustrates display line update periods 605-1, 605-2, . . . , 605-N for updating display lines of a display frame. A sensing period 603 occurs within the non-display update period 602. Alternately, the sensing period 603 may be partly or fully overlapping with display updating period 601. As shown, the processing period 606 occurs during a dedicated portion of the non-display update period 602, and specifically within a non-sensing period 604. Alternately, the sensing period 603 may occur partly or fully overlapping with the display updating period 601, in which case the processing period 606 may occupy a greater portion of the non-display update period than shown. Depending on the length of the non-sensing period 604 within the non-processing period 607, the processing period 606 for processing resulting signals may be distributed across multiple non-display update periods 602, with iterations (I) or portions of the processing performed during each processing period 606.

Figure 9:
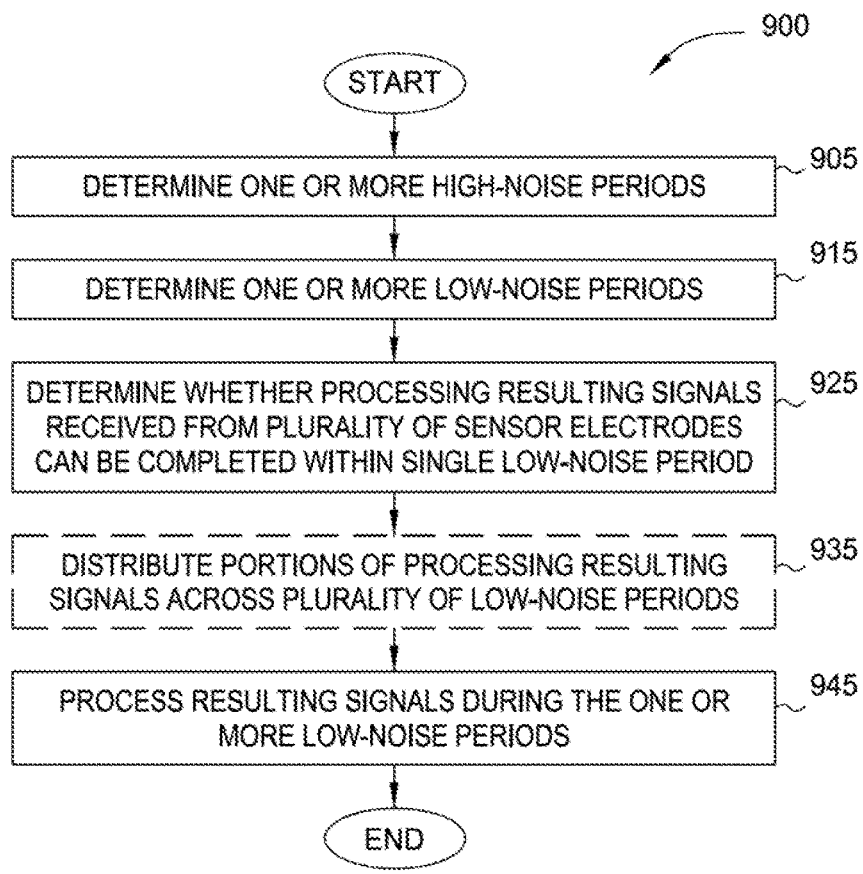
FIG. 9 is a method of performing processing during low-noise periods of interfering circuitry, according to embodiments described herein.

FIG. 9 is a method of performing processing during low-noise periods of interfering circuitry, according to embodiments described herein. Generally, interfering circuitry is included within a same power domain as the component(s) susceptible to the noise. Method 900 may be performed by a determination module of a processing system included within the same power domain.

Method 900 begins at block 905, where one or more high-noise periods are determined. Alternately, one or more discrete noise events may be determined. The high-noise periods and/or discrete noise events may be based on predetermined threshold noise values. At block 915, one or more low-noise periods are determined. The low-noise periods may be based on the determined one or more high-noise periods and/or discrete noise events (e.g., periods not overlapping with the high-noise periods and/or discrete noise events).

At block 925, the determination module determines whether the processing of the resulting signals received from a plurality of sensor electrodes can be completed within a single low-noise period. At optional block 935, the determination module distributes portions of the processing to be performed over a plurality of low-noise periods. In one embodiment, the distribution occurs where processing cannot be completed within the time of a single low-noise period (block 925). In some embodiments, one or more discrete iterations of the processing are distributed among the plurality of low-noise periods. At block 945, the resulting signals are processed during the one or more low-noise periods. Method 900 ends following completion of block 945.

Figure 10:
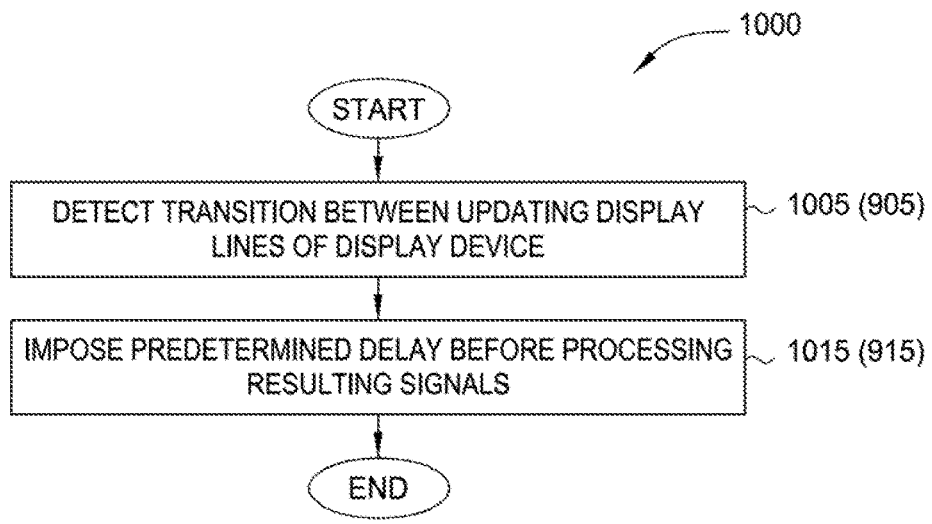
FIG. 10 is a method of determining one or more low-noise periods corresponding to updating a display device, according to embodiments described herein.

FIG. 10 is a method of determining one or more low-noise periods corresponding to updating a display device, according to embodiments described herein. In some embodiments, method 1000 may be performed by the determination module as part of method 900.

Method 1000 begins at block 1005, where the determination module detects a transition between updating display lines of a display device. Generally, the transitions correspond to changes in capacitive loading that result in larger transients on the voltage references and/or ground. In one embodiment, block 1005 is performed within block 905, where one or more high-noise periods or discrete noise events are determined.

At block 1015, the determination module imposes a predetermined delay before processing the resulting signals. The delay may be programmable and/or dynamically adjustable by the determination module. The delay may be based on the length and/or periodicity of the transition periods. In one embodiment, block 1015 is performed within block 915, where one or more low-noise periods are determined following completion of the transition period. Method 1000 ends following completion of block 1015.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

What is claimed is:

1. An input device comprising:
   a display device;
   a plurality of sensor electrodes; and
   a processing system coupled with the plurality of sensor electrodes and configured to:
   receive resulting signals from the plurality of sensor electrodes during a first period;
   determine a plurality of low-noise periods associated with display updating of the display device, and
   process, using analog-to-digital conversion during the plurality of low-noise periods, the resulting signals received from the plurality of sensor electrodes during the first period, wherein the analog-to-digital conversion is performed as a plurality of iterations including first and second iterations, wherein the first iteration is performed during a first low-noise period of the plurality of low-noise periods and the second iteration is performed during a second low-noise period of the plurality of low-noise periods, and wherein the first low noise period and the first period are separated by a first delay corresponding to a high noise period and the first low noise period follows the first period.

2. The input device of claim 1, wherein the determined plurality of low-noise periods occur during one or more non-display update periods.

3. The input device of claim 2, wherein the determined plurality of low-noise periods occur during portions of the one or more non-display update periods in which capacitive sensing is not performed.

4. The input device of claim 1, wherein the determined plurality of low-noise periods correspond to reduced transients occurring on one or more of source electrodes and gate electrodes of the display device.

5. The input device of claim 1, wherein each of the plurality of sensor electrodes comprises at least one display electrode of the display device.

6. The input device of claim 1, wherein determining the plurality of low-noise periods comprises imposing a predetermined delay after detecting a transition between updating display lines of the display device.

7. A processing system comprising:
a display device;
display driver circuitry configured to update the display device based on display update timing of the display device;
sensor circuitry coupled with a plurality of sensor electrodes and configured to:
receive resulting signals from the plurality of sensor electrodes during a first period;
determine a plurality of low-noise periods associated with display updating of the display device, and
process, using analog-to-digital conversion during the plurality of low-noise periods, the resulting signals received from the plurality of sensor electrodes during the first period, wherein the analog-to-digital conversion is performed as a plurality of iterations including first and second iterations, wherein the first iteration is performed during a first low-noise period of the plurality of low-noise periods and the second iteration is performed during a second low-noise period of the plurality of low-noise periods, and wherein the first low noise period and the first period are separated by a first delay corresponding to a high noise period and the first low noise period follows the first period.

8. The processing system of claim 7, wherein the determined plurality of low-noise periods occur during one or more non-display update periods.

9. The processing system of claim 8, wherein the determined plurality of low-noise periods occur during portions of the one or more non-display update periods in which capacitive sensing is not performed.

10. The processing system of claim 7, wherein the determined plurality of low-noise periods correspond to reduced transients occurring on one or more of source electrodes and gate electrodes of the display device.

11. The processing system of claim 7, wherein each of the plurality of sensor electrodes comprises at least one display electrode of the display device.

12. The processing system of claim 7, wherein determining the plurality of low-noise periods comprises imposing a predetermined delay after detecting a transition between updating display lines of the display device.

13. A system comprising:
a processing system comprising analog-to-digital conversion (ADC) circuitry within a power domain; and
interfering circuitry within the power domain,
wherein the processing system is configured to:
receive resulting signals from a plurality of sensor electrodes during a receiving period;
determine one or more discrete noise events produced by the interfering circuitry, and;
control the ADC circuitry to perform ADC operations to process the resulting signals during a plurality of time periods during which the one or more discrete noise events do not occur, wherein the ADC operations are performed as a plurality of iterations including first and second iterations, wherein the first iteration is performed during a first time period of the plurality of time periods and the second iteration is performed during a second time period of the plurality of time periods, and wherein the first time period and the receiving period are separated by a first delay corresponding to a high noise period and the first time period follows the receiving period.

14. The system of claim 13, wherein the interfering circuitry comprises one of a processor and memory, and wherein the one or more discrete noise events comprise one of code execution and memory operation.

15. The system of claim 14, wherein the interfering circuitry comprises a processor and the one or more discrete noise events comprise code execution by the processor, wherein the processing system is further configured to stall the code execution during the plurality of time periods.

16. The system of claim 13, wherein the ADC circuitry is included in a receiver of the processing system, wherein the interfering circuitry is separately included in the receiver, wherein the processing system controls the ADC circuitry to perform ADC operations when the receiver is in a predetermined steady-state.

* * * * *